United States Patent
Grundler et al.

(10) Patent No.: US 8,439,805 B2
(45) Date of Patent: May 14, 2013

(54) HYDRAULIC SYSTEM OF A GEAR BOX

(75) Inventors: Rainer Grundler, Bodman-Ludwigshafen (DE); Thilo Schmidt, Meckenbeuren (DE); Christian Popp, Kressbronn (DE); Heinrich Zeller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 631 days.

(21) Appl. No.: 12/704,611

(22) Filed: Feb. 12, 2010

(65) Prior Publication Data
US 2010/0216597 A1 Aug. 26, 2010

(30) Foreign Application Priority Data
Feb. 24, 2009 (DE) .................... 10 2009 001 110

(51) Int. Cl.
*B60W 10/02* (2006.01)
*B60W 10/04* (2006.01)
*F04B 49/00* (2006.01)

(52) U.S. Cl.
USPC .......................................... 477/174; 417/286

(58) Field of Classification Search .................. 477/52, 477/68, 174; 417/286, 287
See application file for complete search history.

(56) References Cited

U.S. PATENT DOCUMENTS

| 5,845,756 | A | * | 12/1998 | Dairokuno et al. | 192/85.61 |
| 6,350,108 | B1 | | 2/2002 | Haupt | |
| 6,692,402 | B2 | * | 2/2004 | Nakamori et al. | 477/3 |
| 6,769,502 | B2 | | 8/2004 | Nakamori et al. | |
| 7,951,043 | B2 | * | 5/2011 | Reisch et al. | 477/156 |
| 8,216,112 | B2 | * | 7/2012 | Gibson et al. | 477/156 |
| 8,322,135 | B2 | * | 12/2012 | Kure et al. | 60/428 |
| 2004/0179962 | A1 | * | 9/2004 | Hopper | 417/426 |
| 2005/0263352 | A1 | | 12/2005 | Fideler et al. | |
| 2008/0286123 | A1 | | 11/2008 | Yoshinami | |

FOREIGN PATENT DOCUMENTS

| DE | 910 252 | 4/1954 |
| DE | 197 50 675 C1 | 8/1998 |
| DE | 10 2004 025 764 A1 | 5/2006 |
| DE | 601 27 649 T2 | 12/2007 |
| JP | 2007046634 A | 2/2007 |
| JP | 2007320353 A | 12/2007 |
| WO | WO 2006099947 A1 * | 9/2006 |

* cited by examiner

*Primary Examiner* — Tisha Lewis
(74) *Attorney, Agent, or Firm* — Davis & Bujold, PLLC

(57) ABSTRACT

An automatic vehicle transmission comprises a first oil supply unit (10) with at least one mechanically driven first pump (11) and a second oil supply unit (20) with at least one electrically driven second pump (21), and a valve device (14) and a clutch system (1). The second oil supply unit (20) supplies the clutch system (1), during a first operating condition, and the first oil supply unit (10) supplies the clutch system (1), during a second operating condition.

20 Claims, 4 Drawing Sheets

HYDRAULIC SYSTEM OF A GEAR BOX

This application claims priority from German patent application serial no. 10 2009 001 110.2 filed Feb. 24, 2009.

FIELD OF THE INVENTION

The invention concerns a transmission hydraulic system for actuating an automatic transmission.

BACKGROUND OF THE INVENTION

The oil demand of a hydraulically actuated automatic transmission is the sum of several fractions. A first fraction of the operating medium to be provided by an oil supply system is needed for pressurizing the transmission shift elements required for torque transmission, such as clutches. In a first operating condition in which no shifts to change the gear transmission ratio are carried out, a small volume flow to compensate for leakage losses in the clutches acted upon with a clutch pressure for the corresponding transmission ratios is needed. The operating medium, which can even be other than oil, is therefore under a clutch pressure. For a second operating condition, also referred to as transmission shifting in which the transmission ratio is changed, a larger volume flow is required for a short time for filling the clutches that have to be pressurized with the clutch pressure in the new transmission ratio step.

A further fraction of the operating medium is needed for lubricating and cooling the transmission components, but the pressure required for this is substantially lower than for pressurizing the transmission shift elements. Thus, in a hydraulic system as described there are at least two different hydraulic circuits with different pressure levels, each of which has to be supplied with a particular volume flow.

Known hydraulic systems of automatic transmissions are supplied with the operating medium required for actuating the transmission by means of a transmission pump in the form of a displacement pump. The operating medium is delivered by the transmission pump under a certain pressure with a volume flow sufficient to actuate the clutches in the desired manner. In addition, certain transmission components have to be lubricated and/or cooled at low pressure.

In this context the displacement pump has a fixed displacement volume, i.e. one that cannot be varied. The displacement volume is the volume of operating medium that can be geometrically displaced per pump revolution. Since the displacement volume cannot be varied, the volume flow delivered by the transmission pump increases proportionally with the rotation speed of an internal combustion engine driving the transmission pump mechanically.

The displacement volume is designed in accordance with the minimum volume flow demand at given speeds, these speeds in known applications being in the lower part of the internal combustion engine rotation speed range. In addition, the peak demand for the short time when clutches have to be filled during transmission shifts must be covered. Consequently, in the first driving condition in which it is only necessary to top up the leakage quantity, a volume flow at the clutch pressure level provides a large excess. Owing to the proportional relation between the volume flow delivered and the rotation speed of the transmission pump, this means that on passing through the speed range from low to high speeds, there is a further volume flow increase after reaching the minimum demand of the transmission, giving a volume flow excess which is not needed for actuating the transmission shift elements or for cooling or lubrication. Precisely at high rotation speeds this results in large power loss, since the superfluous volume flow is discharged, via a valve, into a transmission housing under ambient pressure, with reduction of the pressure previously produced by means of mechanical power. The energy stored in that pressure is then transformed into heat, which disadvantageously raises the temperature of the operating medium. Moreover, the volume flow sprayed out into the transmission housing causes severe foaming of the operating medium, in particular in the case of oil, and this results in undesired pressure fluctuations, noise, and damage to the pump.

To adapt to the demands of the hydraulic system, the use of displacement pumps with variable displacement volumes is known. The displacement volume varies between a minimum and a maximum value, such that the minimum displacement volume can have values down to zero. Until a minimum demand that serves as a design starting point is reached at a certain speed, the maximum displacement volume is maintained. If the demand of the transmission is covered, the displacement volume can be made still smaller, for example with increasing speed, so that the volume flow remains theoretically constant, although any other variation of the volume flow with speed can also be produced. For peak volume flow demands, for example when filling the clutches during a shift operation, the displacement volume can be briefly increased, but in practice the reaction time until it is adjusted and ultimately the volume flow increase cannot take place spontaneously enough. To be able to reach the design point located in the lower speed range, the displacement volume must be set to its maximum value and the volume flow then increases proportionally with the speed. Only when that speed is reached at which the volume flow demand is covered, can the displacement volume of the transmission pump be reduced. Since in practice this speed is close to the speed that exists at the top end of the consumption-relevant driving cycle, the advantages of the adjustable displacement pumps have no effect on fuel consumption. Disadvantageously, owing to its structural configuration the efficiency of an adjustable displacement pump in the operating range with maximum displacement volume is lower than that of a non-adjustable pump. Furthermore, the structural complexity and thus the cost of an adjustable transmission pump are greater than those of a displacement pump with a fixed displacement volume.

To decouple the volume flow delivered by a displacement pump and the variable rotation speed of an internal combustion engine, electrically powered transmission pumps are known. In this case a displacement pump with a fixed displacement volume is no longer driven by the internal combustion engine but by means of an electric motor, whereby the volume flow can be adjusted independently of the speed of the internal combustion engine. Here, the pressure or volume flow adjustment takes place by varying the speed of the electric motor. The disadvantages in this case are that the volume flow increase is insufficiently rapid to cover a peak demand at the moment of transmission shifting, and the efficiency is low because of the twofold energy conversion when electrical energy is produced by a generator and mechanical energy is transferred from the electric motor to the transmission pump.

In DE 10 2004 025 764 A1 a hydraulic system for the oil supply of a multi-step automatic transmission for motor vehicles is described, in which two pumps are arranged in the transmission. In this case one pump supplies the transmission shift elements and a second pump operating at a lower pressure level is responsible for lubricating and cooling the transmission. To be able to cover the greater oil demand due to filling of the transmission shift elements during a shift operation, in a first version, the pressure in the second pump is raised above the pressure level of the first pump by means of an adjustable pressure-limiting valve so that the volume flow of the second pump flows to the transmission shift elements through a one-way valve in addition to the volume flow of the first pump. In another version, at the moment of the shift operation the two volume flows are combined by means of a multi-channel valve in order to fill the transmission shift elements. Since both pumps are mechanically driven there is still a disadvantageous dependence of the volume flow on the pump rotation speed and thus a high power loss in the upper speed range, with the negative consequences already described.

DE 197 50 675 C1 shows an oil supply system for a transmission with two pumps, such that a first pump is driven by an electric motor and a second pump by an internal combustion engine or a transmission input shaft. The first, electrically driven pump ensures the basic supply to the clutches, i.e. in a first operating condition of the transmission it produces in the clutches the pressure required for torque transmission and compensates for the leakage volume flow. The pressure here is relatively high and the volume flow small. The basic supply for lubrication and cooling comes from the second pump, whose rotational speed is proportional to that of the internal combustion engine, and in this case compared with the first pump a substantially larger volume flow is delivered at comparatively low pressure. The pressure side of the first pump and the pressure side of the second pump are connected to a valve device whose principle is illustrated. If, now, when the transmission is shifted there is for a short time an elevated volume flow demand for filling the new clutches to be pressurized, then the pressure side of the second pump is connected by means of the valve device to the pressure side of the first pump. In what follows, the hydraulic system in which the pump conveys the operating medium will be referred to in general as the pressure side. In this way the volume flow of the second pump is added completely or partially to that of the first pump, so that the elevated clutch demand can be covered. For the case when, at low speeds and due to the proportional speed dependence of the volume flow of the second pump, the supply for lubrication and cooling is no longer sufficient, the valve device can be shifted so as to connect the first pump to the lubrication and cooling circuit, whereby it reinforces the second pump. The structure and operating mode of the valve device are not shown. A disadvantage in this case is that the displacement volumes of the two pumps are chosen such that only when acting together can they cover the peak demand at the time of the gear shift. Thus, if the electrically driven pump fails it is no longer possible to shift the transmission.

SUMMARY OF THE INVENTION

The purpose of the present invention is to improve a system of the type described, consisting of two mutually independent oil supply units for the supply of the clutch system of an automatic transmission according to demand and thus in an efficiency-optimized manner, so that the power loss due to the first pump outside transmission shifts is minimal and the functionality of the transmission is ensured even if the second pump fails.

An automatic vehicle transmission comprises a first oil supply unit with at least one mechanically driven first pump, and a second oil supply unit with at least one electrically driven second pump, and a valve device for regulating the pressure of the first oil supply unit. The oil supply unit is also suitable for supplying the vehicle transmission with an operating medium other than oil. In addition, the automatic vehicle transmission comprises a clutch system by means of which various transmission ratios of the vehicle transmission can be engaged. For this, the second oil supply unit is provided in order to supply the clutch system in a first operating condition. To supply the clutch system in a second operating condition, according to the invention the first oil supply unit is provided. With a respective oil supply unit designed to cover the demand of the operating condition concerned, the clutch system can be supplied according to need, whereby the power loss for oil supply is reduced and the overall efficiency is therefore improved.

In one version of the invention it is possible for a fixed transmission ratio step to be selected in the first operating condition and for a change of transmission ratio steps to be shifted in the second operating condition.

In a particularly advantageous version of the invention, the first pump of the first oil supply unit is in the form of a displacement pump whose displacement volume is chosen such that the volume flow delivered by the first pump is sufficient to cover the oil demand of the transmission as a whole in all operating conditions. Since the first operating condition requires a larger volume flow than the second operating condition, in the event that the second oil supply unit failsk the first oil supply unit can supply the transmission in all its operating conditions.

A variant is designed such that the first pump is connected in a rotationally fixed manner to a transmission shaft driven by an internal combustion engine. In this way the first pump is driven at all times when the internal combustion engine is in operation for driving the vehicle.

Alternatively, a clutch is arranged between the first pump and the transmission shaft driven by the internal combustion engine.

Advantageously, the second pump is connected in a rotationally fixed manner to an output shaft of an electric motor. The volume flow produced by the second pump is thus a function of the speed of the electric motor.

In a further design of the invention the first pump is connected in parallel with a first line leading to the clutch system, with a valve device designed as a pressure regulation valve and acting as a pressure limiting valve.

In this case it is possible to arrange a control valve between the valve device and the second pump, which connects the valve device and the second pump or separates them from one another. In this connection, depending on the setting of the control valve the valve device can be acted upon by the pressure of the second oil supply unit as a control pressure.

In this connection, another embodiment provides that the first pump is connected by a first line to an inlet of a first one-way valve, and the second pump is connected by a second line to an inlet of a second one-way valve. An outlet of the first one-way valve is connected by at least one third line to an outlet of the second one-way valve.

In a further development of the object of the invention the clutch can be actuated hydraulically, pneumatically, electrically, or mechanically. Hydraulic or electric actuation are particularly advantageous since, to enable other transmission functions, the transmission already has an electric and a hydraulic supply.

A method for supplying oil to a vehicle transmission is indicated. The vehicle transmission comprises a first oil supply unit with at least one mechanically driven first pump and a second oil supply unit with at least one electrically driven second pump, as well as a valve device and a clutch system by means of which the transmission ratio steps of the vehicle transmission can be engaged. The second oil supply unit is provided for supplying the clutch system in a first operating condition. In a method according to the invention for supplying oil to this vehicle transmission, during a second operating condition a first oil supply unit supplies to the clutch system the volume flow produced.

In an embodiment of the method in combination with a vehicle transmission according to the invention, in the first operating condition no transmission shift takes place, so a fixed transmission ratio step is selected. In this first operating condition the volume flow to the clutch system serves only to compensate for leakage losses. In the second operating condition a transmission shift is carried out, during which a change of the transmission ratio step takes place.

In a version of the method for supplying oil, a first pressure is produced by the first oil supply unit and adjusted by the valve device. A second pressure is produced by the second oil supply unit and adjusted by means of the speed of the electric motor.

It is also provided that in the first operating condition the first pressure is adjusted in such manner that the force it exerts on a first closure element of a first one-way valve is smaller than the sum of the forces of the second pressure and a first valve spring acting on the first closure element. Thus, the volume flow of the first oil supply unit cannot pass through the first one-way valve to the clutch system, which therefore receives its supply from the second oil supply unit.

Advantageously, on changing from the first to the second operating condition the value of the first pressure is increased by the valve device until the force of the first pressure opens the one-way valve against the sum of the forces of the first valve spring and the second pressure, so that the volume flow of the first oil supply unit is delivered to the clutch system.

In the case of a first oil supply unit in which a clutch is arranged between the transmission shaft and the first pump, another embodiment of the method provides that in the first operating condition the clutch of the first oil supply unit is open and, on transition from the first to the second operating condition, it is closed.

In an embodiment of the first oil supply unit in which the first pump is driven directly by the internal combustion engine via the transmission shaft, according to an advantageous method the valve device in the first operating condition is switched in such manner that the first pressure line is connected to the first suction line and to the cooling and lubrication system in order to reduce the first pressure to the maximum extent, at least to below the value of the second pressure. In this case the first pressure can be reduced down to the ambient pressure.

In this connection an advantageous embodiment of the method provides that in the first operating condition the valve device is connected by a control valve to the second pump or the pressure line of the second oil supply unit and the second pressure acts on the valve device so that in the manner described, the first pressure is reduced. On transition from the first to the second operating condition the control valve interrupts the connection between the second pump and the valve device, so that the first pressure is increased.

Finally, it is regarded as advantageous that in a third operating condition with the internal combustion engine switched off the second oil supply unit maintains in the clutch system a pressure required for re-starting. During the operation of the vehicle this third operation condition occurs when the vehicle's operation stops for a defined and limited time. On transition to this operating condition the internal combustion engine is switched off not by the driver but automatically, while the vehicle remains in operation. The third operating condition is also known as start-stop operation, in which, during short stop times, fuel is saved by switching the engine off automatically.

BRIEF DESCRIPTION OF THE DRAWINGS

Example embodiments of the invention are illustrated in the drawings and described in more detail below. The drawings show.

DETAILED DESCRIPTION OF THE PREFERRED EMBODIMENTS

Figure 1:
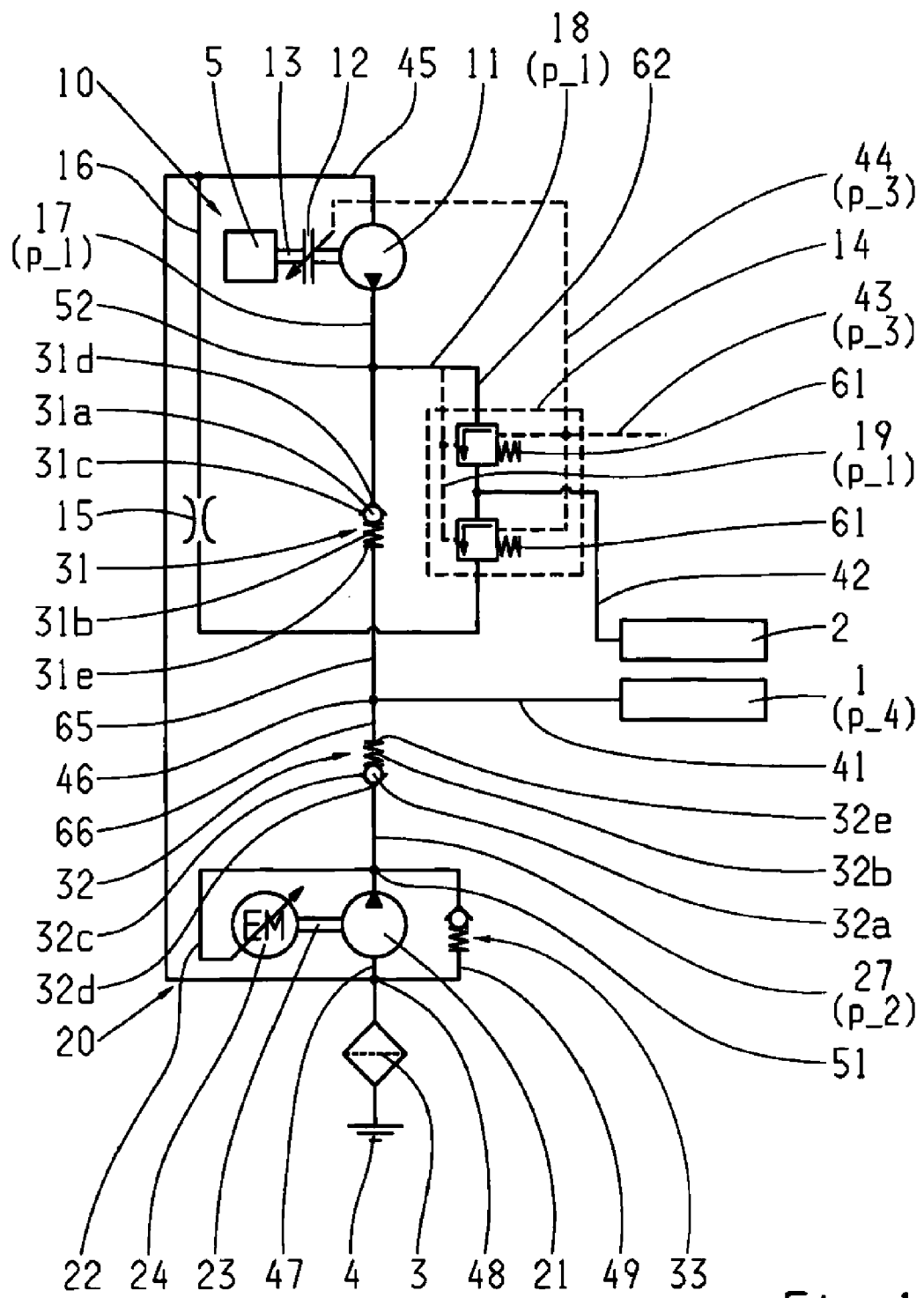
FIG. 1: Transmission hydraulic system with two pumps, such that the first pump can be connected by a clutch

FIG. 1 shows the hydraulic layout of a vehicle transmission with two mutually independent oil supply units 10 and 20. The oil supply unit 10 comprises a pump 11 made as a displacement pump with fixed displacement volume. The pump 11 can be connected in a rotationally fixed manner by means of a friction clutch 12 to a transmission shaft 13, this transmission shaft 13 being driven by an internal combustion engine 5 that serves as the drive unit of the vehicle. In operation, the pump 11 draws in the operating medium, usually oil, through a suction line 45 and a filter 3 from an oil reserve 4. The oil reserve 4 is usually held in an oil sump of a transmission housing. The pump 11 delivers the oil at a pressure $p\_1$ to a pressure line 17 at the other end of which is arranged a one-way valve 31. The one-way valve 31 is made as a seat valve and comprises a closure element 31a, a spring 31b and a valve seat 31c. If the sum of a pressure force of the operating medium at an outlet side 31a of the one-way valve and of the spring 31b is larger than a pressure force at an inlet side 31d of the one-way valve 31, the closure element 31a is pressed against the valve seat 31c and the valve is closed. The one-way valve 31 is the system boundary of the oil supply unit 10. Between the pump 11 and the one-way valve 31, at a branch point 52 a line 18 is connected to the pressure line 17. The line 18 connects the pump 11 to an input side 62 of a valve device 14. The valve device 14 is a pressure regulator valve which acts as a pressure limiting valve. Via a feedback line 19 that branches off the line 18, the pressure $p\_1$ produced by the pump 11 acts as feedback for regulating the pressure $p\_1$ to open the valve device 14. Via a pilot control line 43 connected to the valve device 14, a pilot pressure $p\_3$ acts to close this latter, i.e. the flow of the operating medium through the valve device 14 is made increasingly difficult, whereby the pressure $p\_1$ increases. The force of a spring 61 also acts in the closing direction. The valve device 14 is connected to a lubrication and cooling system 2 of the transmission by a line 42. A charging line 16, in which an injector 15 is arranged, connects the valve device 14 to the suction drive 45 of the pump 11. A control line 44 that branches off from the pilot control line 43 is connected to the clutch 12.

The second oil supply unit 20 consists of a pump 21 also made as a displacement pump with fixed displacement volume. By means of an output shaft 23 of a variable-speed electric motor 24 the pump 21 is connected in a rotationally fixed manner to the motor, and in operation draws in the operating medium, usually oil, from the oil reserve 4 through a suction line 47, a branch 48 and the filter 3. Oil emerges from the pump 21 through a pressure line 27. At the other end of the pressure line 27 is arranged a one-way valve 32.

The electric motor 24 adjusts the rotational speed of the pump 21 and hence its volume flow and a pressure $p\_2$ in the pressure line 27. To enable regulation of the pressure $p\_2$, this acts on the electric motor 24 via a feedback line 22 connected to the pressure line 27 at a branch point 51. A line 49 also branches at the branch point 51 from the pressure line 27 and connects it to the branch point 48. Between the branch points 51 and 48, a one-way valve 33 is arranged in the line 49. A line 65 is arranged between the outlet 31e of the one-way valve 31 and a branch point 46. A line 66 is arranged between the outlet 32e of the one-way valve 32 and the branch point 46. A line 41 connects the branch point 46 to a clutch system 1.

In what follows, in the vehicle's transmission two operating conditions will be distinguished. In a first operating condition no gearshifts take place. The clutch system 1 must be acted upon with a clutch pressure $p\_4$ to enable torque transmission to take place in the vehicle's transmission. Depending on which of the oil supply units 10 or 20 is supplying the clutch system, the clutch pressure $p\_4$ is equal to the pressure $p\_1$ or the pressure $p\_2$. The volume flow needed by the clutch system 1 only has to compensate for leakage losses and is correspondingly small. In a second operating condition, to change a transmission ratio step a gearshift takes place. In this case one or more clutches of the clutch system 1 which are pressurized in a first transmission ratio step are first vented, i.e. connected to a space which is at ambient pressure, whereby the pressure in the clutches concerned falls and torque can no longer be transmitted by those clutches. To shift to the next transmission ratio step one or more clutches of the clutch system 1 have to be filled with the operating medium in a finite, usually short time and brought up to an appropriate pressure so that a torque can be transmitted in the new transmission ratio. Thus, to fill the clutch system 1 in a specified and limited time a relatively larger volume flow is required.

In the first operating condition the electric motor 24, with its output shaft 23, drives the pump 21 in the oil supply unit 20. The pump 21 draws the operating medium from the oil reserve 4 through the section line 47, the branch point 48 and the filter 3, and delivers its, via the pressure line 27, the one-way valve 32, the line 66, the branch point 46 and the line 41, to the clutch system 1, which it pressurizes to the pressure $p\_2$. In the oil supply unit 10, the clutch 12 is disengaged and the pump 11 is static, so that it does not deliver any volume flow and the pressure line 17 is unpressurized. The pressure $p\_2$ acts on the outlet 31e of the one-way valve 31 and presses the closure element 31a against the valve seat 31d, whereby the one-way valve 31 is closed so that no oil can flow from the oil supply unit 10 into the pressure line 17.

The volume flow required in the first operating condition covers the leakage losses in the clutch system 1 and is determined by the speed of the electric motor 24 and the displacement volume of the pump 21. If now the leakage losses in the clutch system 1 increase, for example because of a temperature rise, the pressure $p\_2$ also decreases. Thanks to the feedback line 22 the changed pressure $p\_2$ affects the regulation of the electric motor 24 and this increases its speed and hence the speed of the pump 21. This increases the volume flow from the pump 21 so that the desired pressure value $p\_2$ is produced again. If the clutch system 1 has to transmit a higher torque, the pressure $p\_2$ must be increased. For this, an electronic transmission control unit emits a signal to the electric motor 24, which increases its speed and thus the pressure $p\_2$. The advantage of such a system in the first operating condition is the supply of oil according to need, in which only that volume flow is delivered which is required to pressurize the clutch system 1 or to compensate for its leakage losses.

If now, to fill the clutch system 1 a larger volume flow is needed during a transmission shift, the clutch 12 is engaged and the pump 11 is accelerated to the speed of the transmission shaft 13 driven by the internal combustion engine 5. In relation to its displacement volume, the pump 11 is designed so as to cover the maximum oil demand of the transmission at the corresponding speeds of the internal combustion engine 5. This design offers the additional advantage that even if the oil supply unit 20 can produce no volume flow or only an insufficient one, the clutch system 1 is supplied and thus the transmission functions are still retained. Situations in which the volume flow from the oil supply unit 20 decreases are, for example, a defective pump 21, a defective electric motor 24, or too little or no electrical energy to drive the electric motor 24. This is the case, for example, when driving with an emergency program, or with an empty battery, in particular during start-stop operation. Furthermore, the volume flow delivered by the pump 21 is reduced by too high or too low an oil temperature. If the oil temperature is too low, the viscosity increases and the pump is no longer completely filled. If the oil temperature is too high, the internal oil leakage losses of the pump 21 increase, as do the oil leakage losses in and to the clutch system 1.

This also means that starting from a mechanically driven pump of the prior art, with the design according to the invention this would not be changed in relation to its displacement volume and its arrangement. The pump 21 driven by the electric motor would be added to a system of the prior art which only has a mechanically driven pump to cover the oil demand in all operating conditions. Among other things this has the advantage that it can be added as a module to an existing system and so, according to requirements, designed with or without an electrically driven pump 21. Likewise, starting from the prior art no new design of the existing pump 11 is needed for the configuration of the oil supply system according to the invention for the vehicle's transmission. Furthermore, if there is an electrical failure of the pump 21 the clutch system 1 can still be supplied sufficiently and the vehicle's transmission remains fully functional.

The pump 11 draws the operating medium, preferably oil, from the oil reserve 4 through the suction line 45 and the filter 3, and delivers it into the pressure line 17. The valve device 14 arranged parallel to the pressure line 17, which acts as a pressure limiting valve, is acted upon via the line 43 by a pilot pressure $p\_3$. The valve device 14 regulates the level of the pressure $p\_3$. If a transmission shift is to be carried out, the pilot pressure $p\_3$ and thus the pressure $p\_1$ is increased until it exceeds the pressure $p\_2$ and opens the one-way valve 31. The volume flow from the pump 11 now fills the appropriate clutches in the clutch system 1 and pressurizes them with the pressure $p\_1$, which is regulated by the valve device 14 to the desired level. The unnecessary volume flow leaves the valve device 14 through the charging line 16. In the injector 15 the flow speed of the operating medium is increased by virtue of a constricted line cross-section and it is then fed into the suction line 45. There, the initially accelerated operating medium increases the pressure level ahead of the pump 11 as the flow speed subsequently decreases, whereby the pump 11 is filled better, particularly at high rotational speeds. This counteracts the occurrence of cavitation in the pump 11, so reducing noise, wear and undesired pressure fluctuations.

Furthermore, at least theoretically the pressure difference between the suction line 45 and the pressure line 17 is reduced, and hence also the mechanical power required for driving the pump 11.

The pressure $p\_1$ acts to close the one-way value 32. To avoid overloading the pump 21 at that moment, the one-way valve 33 opens from a pressure above the maximum value of the pressure $p\_2$ but low enough to avoid damaging the pump 21. The operating medium can flow to the suction lines 45 and 47 or to the unpressurized oil reserve 4 and relieves the pressure line 27 and thus also the pump 21 and the electric motor 24. Accordingly, the oil supply unit 20 also operates during the second operating condition and during the filling of and build-up of pressure in the clutch system 1.

After the transmission shift and thus the end of the second operating condition, the clutch 12 is disengaged again, whereby the pump 11 stops and the pressure $p\_1$ decreases until the pressure $p\_2$ exceeds it. When $p\_2$ becomes larger than $p\_1$ it opens the one-way valve 32 and closes the one-way valve 31. Then the pressure $p\_2$ acts upon the clutch system 1 in the first operating condition, i.e. the condition not involving transmission shifts.

The clutch 12 can be actuated in various ways. In a first variant it is actuated by the pilot pressure $p\_3$. When the transmission shift is initiated, the electronic transmission control unit sends a signal to a pilot control valve (not shown), which increases the pilot pressure $p\_3$ in the line 43. Via the line 43 one side of the valve device 14 is acted upon and, in co-operation with the spring 61 of the valve device 14, it is adjusted in the closing direction so as to increase the pressure $p\_1$. In parallel with the valve device 14 the pilot pressure $p\_3$ passes through the line 44 to the clutch 12 and engages it, whereby the pump 11 is set into operation.

Figure 2:
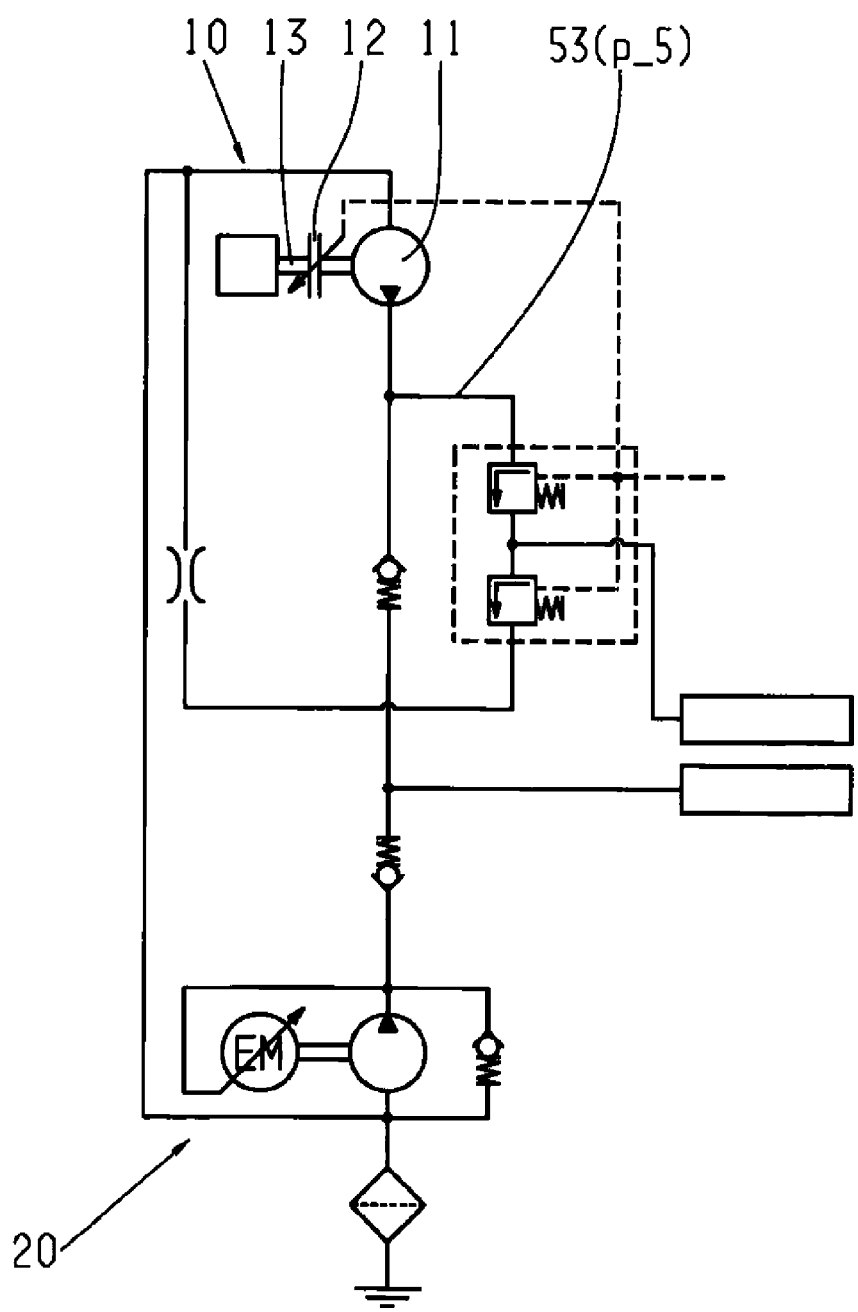
FIG. 2: Transmission hydraulic system with two pumps, such that the first pump can be closed automatically

FIG. 2 shows an alternative actuation of the clutch 12 by means of an independent switching pressure $p\_5$ instead of the pilot pressure $p\_3$ of FIG. 1. Thus, the line 44 in FIG. 1 is not needed. The switching pressure $p\_5$ is triggered by the electronic transmission control unit and adjusted in a line 53 by a valve (not shown).

For the switching pressure $p\_5$ there are two switching possibilities. In the first of these the switching pressure $p\_5$ acts to engage the clutch 12, so that the pump 11 is connected rotationally fixed to the transmission shaft 13. In this case the signal for acting upon and thus engaging the clutch 12 by means of the switching pressure $p\_5$ is given when the transmission shift is initiated by the electronic transmission control unit. After the shift or reversion to the first operating condition the switching pressure $p\_5$ decreases again, whereby the clutch 12 disengages and the pump 11 stops.

In another switching possibility the clutch 12 is disengaged by the action of the switching pressure $p\_5$, i.e. when the transmission shift is initiated the switching pressure $p\_5$ is reduced, for example by venting, and the clutch 12 engages whereby the pump 11 is driven by the drive engine and oil supply therefore takes place via the oil supply unit 10 and the pump 11. This switching option has the advantage that in the event of an unintended pressure loss in the line to the clutch 12 pressurized with the switching pressure $p\_5$, the clutch is engaged and the transmission is fully supplied in any operating condition.

A further possibility for clutch actuation is to make the clutch 12 as an electromagnetic clutch, for example a magnetic clutch, such that an electric signal produced by the electronic transmission control unit brings about the actuation of the clutch 12. In this case, depending on the design of the clutch 12 the possibilities exist of engaging or of disengaging it when energized with current. Disengaging when energized has the advantage that in the event of current failure the clutch remains engaged and the oil supply to the vehicle's transmission is ensured.

Hydraulic or electrical actuation of the clutch has the advantage that the energy required for its actuation is already available in the vehicle or the vehicle's transmission.

Moreover, pneumatic actuation of the clutch 12 is also conceivable.

Figure 3:
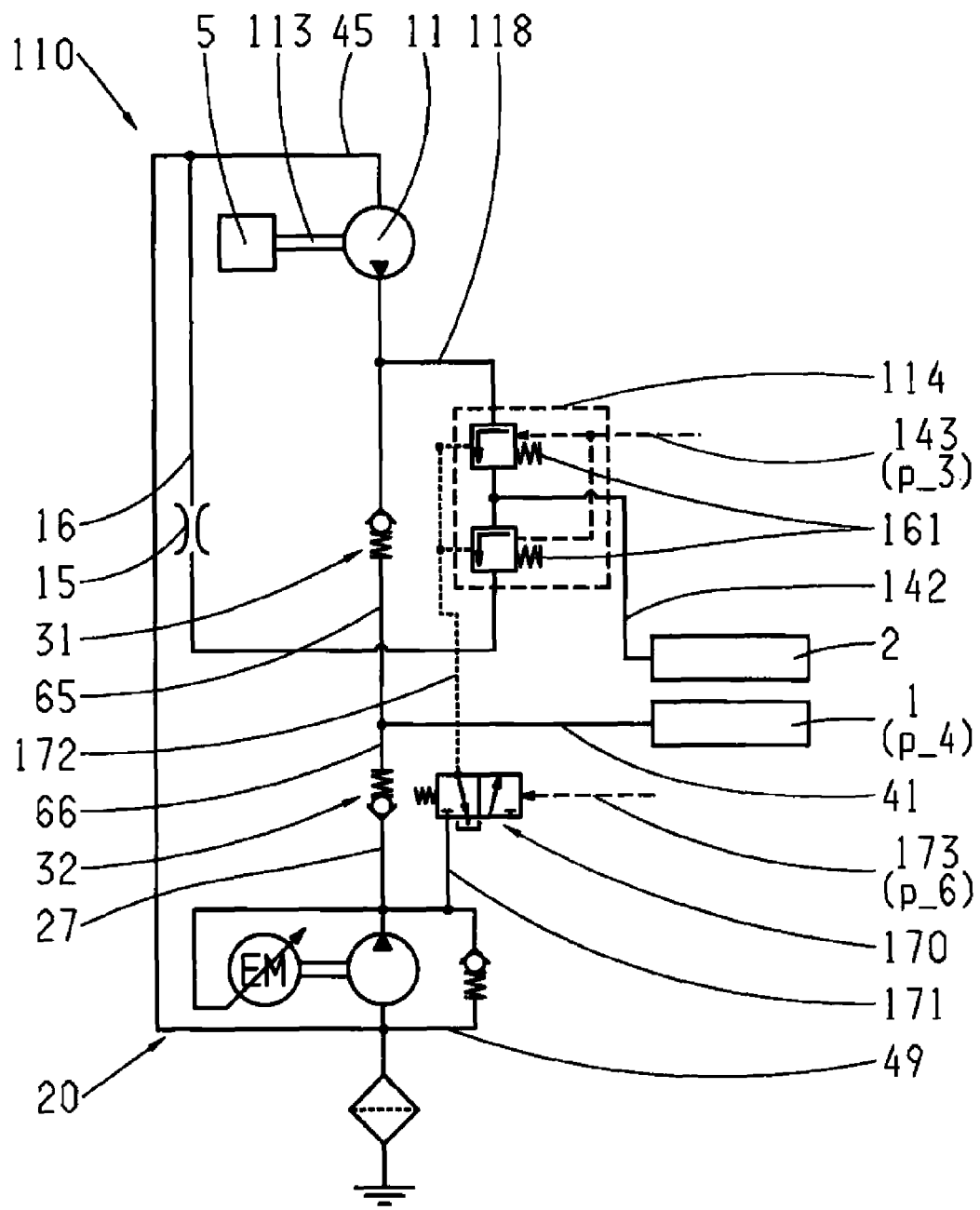
FIG. 3: Transmission hydraulic system with two pumps, such that the second pump cannot be decoupled from its drive.

FIG. 3 shows an alternative design of a vehicle transmission with two mutually independent oil supply units 110 and 20. In this case the pump 11 cannot be mechanically decoupled by means of a clutch from a driving transmission shaft 113, but is connected in a rotationally fixed manner to the transmission shaft driven by the internal combustion engine 5. From the line 49 a control line 171 and a control line 172 lead to a valve device 114. Between the control lines 171 and 172 is arranged a control valve 170, which can connect or separate them. The control valve 170 is actuated by a switching pressure $p\_6$ from a control line 173.

In the first operating condition, i.e. when a fixed transmission ratio step of the vehicle transmission is engaged, the clutch system 1 is supplied from the oil supply unit 20 as described under FIG. 1. In this case the lines 27, 66, 65 and 41 are pressurized with the pressure $p\_2$ and the one-way valve 31 is closed under the action of the pressure $p\_2$. Since in the first operating condition, i.e. when no transmission shifts are involved, the volume flow from the oil supply unit 110 is not required, the pressure $p\_1$ must not exceed $p\_2$ so as to prevent opening of the one-way valve 31. Thus, the control valve 170 is switched so as to connect the control lines 171 and 172 to one another. Via the control lines 171 and 172 the pressure $p\_2$ acts on a valve device 114 which behaves as a pressure limiting valve, and moves it against the pilot pressure $p\_3$ from a pilot control line 143 and the force of the spring 161, in such manner that the valve device 114 offers only minimal resistance to the flow of the operating medium. Consequently, the operating medium delivered by the oil supply unit 110 flows completely through the line 118 to the valve device 114. Part of the flow volume passes through the line 142 into the cooling and lubrication system 2, in which only a low pressure can be built up. Another part of the volume flow flows through the charging line 16 and the injector 15 into the practically unpressurized suction line 45, so that the value of the pressure $p\_1$ is at least lower than the value of $p\_2$. In this way the pressure $p\_1$ can even be reduced down to ambient pressure.

If now, from the first operating condition a change is made to the second operating condition in order to initiate a gearshift, in which second condition the oil supply unit 110 supplies the clutch system 1, the pressure $p\_1$ must be raised above the pressure $p\_2$ so as to open the one-way valve 31 and close the one-way valve 32. This is done by disconnecting the control lines 171 and 172 from one another and also venting the control line 172. Thereby, the force of the spring 161 and that of the pilot pressure $p\_3$ act to close the valve device 114 and the pressure $p\_1$ increases. As soon as it exceeds the pressure $p\_2$, the one-way valve 31 opens and the one-way valve 32 closes, so that the volume flow from the oil supply unit 110 fills the clutch system.

A possibility for actuating the control valve 170 to separate the control lines 171 and 172 is to pressurize the control line 173 with a switching pressure $p\_6$ by means of a signal from the electronic transmission control unit when the transmission shift is initiated. The control valve 170 is so designed that on being moved by the switching pressure $p\_6$ against the force of a spring it disconnects the control lines 171 and 172, and in this switching position the control line 172 is vented.

An alternative to this would be to pressurize the control line 173 with the switching pressure $p\_6$ in the first operation condition, the design of the switching valve then being such that under the action of the switching pressure $p\_6$ it connects the control lines 171 and 172. On initiating a transmission shift the control line 173 would then have to be vented and the spring of the control valve 170 would move it to a position in which the connection between the control lines 171 and 172 would be interrupted and the control line 172 would be vented. The pilot pressure p_3 and the force of the spring 161 would then close the valve device 114, so increasing the pressure p_1. This alternative is advantageous in the event that due to a partial electric failure the switching pressure p_6 can no longer be built up and the control line 173 would therefore be unpressurized or vented. With this arrangement the control valve 170 would then separate the control lines 171 and 172 and vent the line 172, so that in the manner described, the oil supply unit 110 which can cover the total oil demand of the transmission is in operation.

Figure 4:
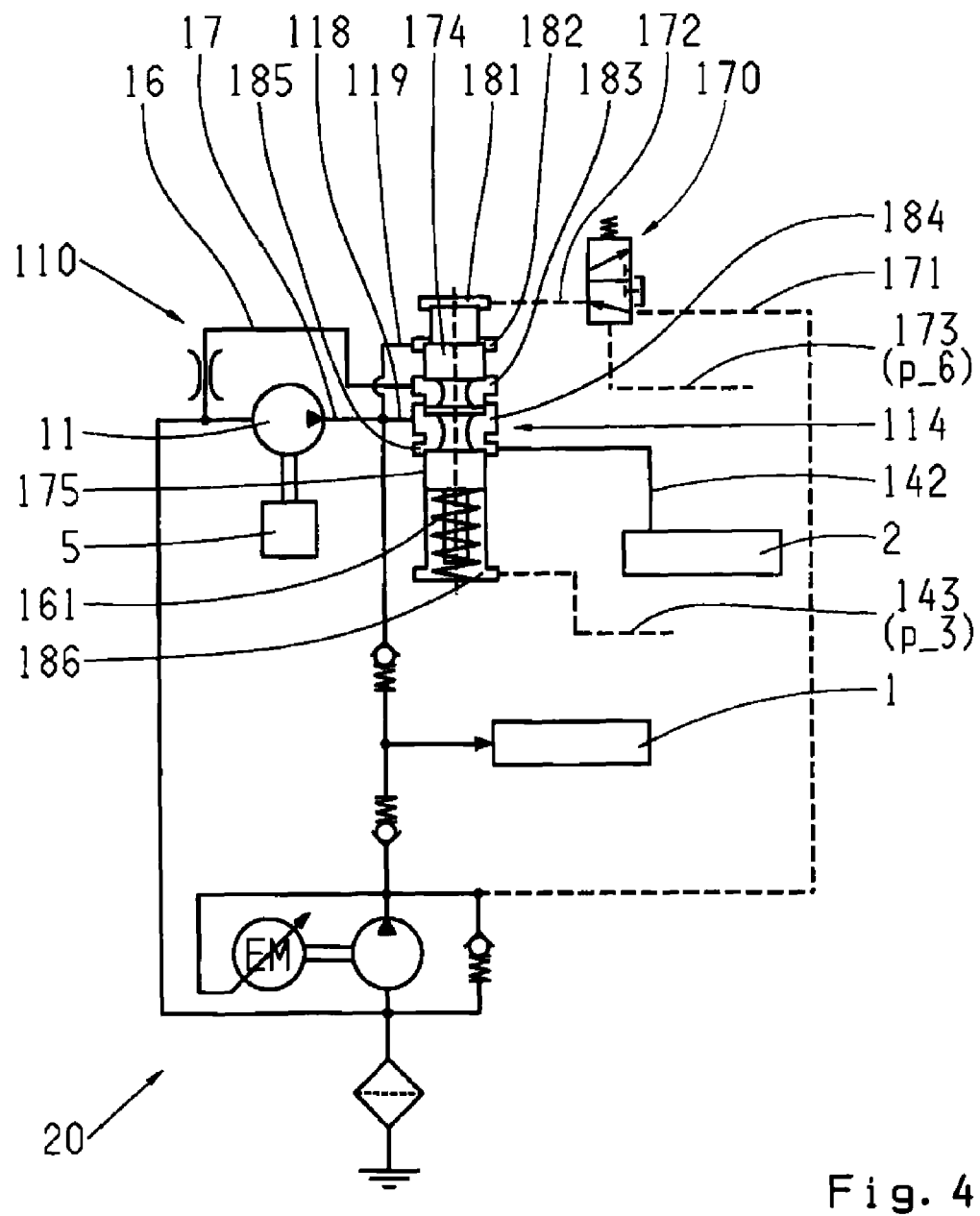
FIG. 4: Transmission hydraulic system according to FIG. 3, with a detailed illustration of a valve device that acts as a pressure limiting valve

FIG. 4 shows an example for the design of the valve device 114 and its connection to the oil supply unit 110. The valve device 114, which acts as a pressure limiting valve, is in this case made as a slide valve. A valve slide 174 is fitted to move longitudinally in a valve bore 175, which is usually formed in a control housing (not shown). The valve bore 175 extends through six pressure spaces 181, 182, 183, 184, 185 and 186. In the first operating condition, as shown, the pressure space 181 is acted upon by the pressure p_2 since the control valve 170 connects the control lines 171 and 172. The valve slide 174 is pushed against the force of the spring 161 in the direction of the wall of the pressure space 186, if the pressure p_2 overcomes the force of the spring 161 and that of the pilot pressure p_3. The pressure space 186 is acted upon via the pilot control line 143 by the pilot pressure p_3. In this end position of the value slide 174 the pressure space 184 is connected with the pressure spaces 183 and 185. Through the line 118 that opens into the pressure space 184, part of the operating medium flows through the pressure space 183 into the charging line 16 and finally into the suction line 45. Another part-quantity of the operating medium flows through the pressure space 185 to the cooling and lubrication system 2 of the transmission. To initiate a transmission shift, by means of the electronic transmission control unit the pressure space 181 is vented by actuating the control valve 170 and the valve slide 174 is pressed by the pilot pressure p_3 and/or the force of the spring 161 against a wall of the pressure space 181. In this position of the valve slide 174 the pressure space 184 supplied by the pump 11 is separated from the pressure spaces 183 and 185. Since no operating medium can any longer flow away into the section line 45 or the cooling and lubrication system 2, the pressure p_1 in the pressure line 17 and in the line 118 connected to it and the feedback line 119 increases. Through the feedback line 119 the pressure p_1 acts in the pressure space 182 on the valve slide in the direction opposite to the pilot pressure p_3 and the force of the spring 161, whereby a force equilibrium is established on the valve slide 174. Depending on the level of the pilot pressure p_3, in this operating condition the pressure p_1 needed to actuate the clutch system for the shift process is produced.

INDEXES

1 Clutch system
2 Cooling/lubrication system
3 Filter
4 Oil reserve
5 Internal combustion engine
10 Oil supply unit
11 Pump
12 Clutch
13 Transmission shaft
14 Valve device
15 Injector
16 Charging line
17 Pressure line
18 Line
19 Feedback lines
20 Oil supply unit
21 Pump
22 Feedback line
23 Output shaft
24 Electric motor
27 Pressure line
31 One-way valve
31a Closure element
31b Valve spring
31c Valve seat
31d Inlet
31e Outlet
32 One-way valve
32a Closure element
32b Valve spring
32c Valve seat
32d Inlet
32e Outlet
33 One-way valve
41 Line
42 Line
43 Pilot control line
44 Control line
45 Suction line
46 Branch point
47 Suction line
48 Branch point
49 Line
51 Branch point
52 Branch point
53 Line
61 Spring
62 inlet of valve device
65 Line
66 Line
110 Oil supply unit
113 Transmission shaft
114 Valve device
118 Line
119 Feedback line
143 Pilot control line
161 Spring
170 Control valve
171 Control line
172 Control line
173 Control line
174 Valve slide
175 Valve bore
176 Vent
181 Pressure space
182 Pressure space
183 Pressure space
184 Pressure space
185 Pressure space
186 Pressure space
p_1 Pressure
p_2 Pressure
p_3 Pilot pressure
p_4 Clutch pressure
p_5 Switching pressure
p_6 Switching pressure

The invention claimed is:

1. An automatic vehicle transmission comprising:
a first oil supply unit (10, 110) comprising at least one mechanically driven first pump (11),
a second oil supply unit (20) comprising at least an electrically driven second pump (21),
a valve device (14, 114),
a clutch system (1) by which various transmission ratio steps are engagable,
a first one-way valve (31), located between the first oil supply unit (10, 110) and a pressure line (41) for the clutch system (1), for only permitting oil to flow from the first oil supply unit (10, 110) to the clutch system (1),
a second one-way valve (32), located between the second oil supply unit (20) and the pressure line (41) for the clutch system (1), for only permitting oil to flow from second oil supply unit (20) to the clutch system (1),
the second oil supply unit (20) supplying the clutch system (1) with oil during a first operating condition, and
the first oil supply unit (10, 110) supplying the clutch system (1) with oil during a second operating condition.

2. The automatic vehicle transmission according to claim 1, wherein during the first operating condition, a fixed transmission ratio step is selected and during the second operating condition, a transmission ratio step change is shifted.

3. The automatic vehicle transmission according to claim 1, wherein the first pump (11) is a displacement pump, and a displacement volume of the first pump (11) is selected so that a volume flow delivered by the first pump (11) is sufficient to cover an oil demand of the transmission during both the first and the second operating conditions.

4. The automatic vehicle transmission according to claim 1, wherein the first pump (11) is connected, in a rotationally fixed manner, to a transmission shaft (113) that is driven by an internal combustion engine (5).

5. The automatic vehicle transmission according to claim 4, wherein a clutch (12) is arranged between the first pump (11) and the transmission shaft (13) that is driven by the internal combustion engine (5).

6. The automatic vehicle transmission according to claim 1, wherein the second pump (21) is connected, in a rotationally fixed manner, to an output shaft (23) of an electric motor (24).

7. The automatic vehicle transmission according to claim 1, wherein the first pump (11) is connected parallel to a first pressure line (17) leading to the clutch system (1) with the valve device (14, 114) designed as a pressure regulating valve.

8. The automatic vehicle transmission according to claim 4, wherein a control valve (170) that one of connects and separates the valve device (114) and the second pump (21) of the second oil supply unit (20) is arranged between the valve device (114) and the second pump (21).

9. An automatic vehicle transmission comprising:
a first oil supply unit (10, 110) comprising at least one mechanically driven first pump (11),
a second oil supply unit (20) comprising at least an electrically driven second pump (21),
a valve device (14, 114) connected with the first oil supply unit (10, 110),
a clutch system (1) by which various transmission ratio steps are engagable,
the second oil supply unit (20) supplying the clutch system (1) with oil during a first operating condition, and
the first oil supply unit (10, 110) supplying the clutch system (1) with oil during a second operating condition;
wherein the first pump (11) is connected, by a first pressure line (17), to an inlet (31d) of a first one-way valve (31) and the second pump (21) is connected, by a second pressure line (27), to an inlet (32d) of a second one-way valve (32), and an outlet (31e) of the first one-way valve (31) is connected, by at least one further line (65, 66), to an outlet (32e) of the second one-way valve (32), and the at least one further line (65, 66) is connected to the clutch system (1).

10. The automatic vehicle transmission according to claim 5, wherein the clutch is operated one of hydraulically, pneumatically, electrically and mechanically.

11. A method of supplying oil to a vehicle transmission comprising a first oil supply unit (10, 110) with at least one mechanically driven first pump (11) and a second oil supply unit (20) with at least one electrically driven second pump (21), a clutch system (1) by which various transmission ratio steps are engagable, a first one-way valve (31), located between the first oil supply unit (10, 110) and a pressure line (41) for the clutch system (1), for only permitting oil to flow from the first oil supply unit (10, 110) to the clutch system (1), a second one-way valve (32), located between the second oil supply unit (20) and the pressure line (41) for the clutch system (1), for only permitting oil to flow from second oil supply unit (20) to the clutch system (1), valve device (14, 114) being connected between the first oil supply unit (10, 110) and the first one-way valve (31), and the second oil supply unit (20) is provided to supply the clutch system (1) during a first operating condition, the method comprising the step of:
supplying the clutch system (1) with a volume flow, produced by the first oil supply unit (10, 110), during a second operating condition.

12. The method of supplying oil according to claim 11, further comprising the step of selecting a fixed transmission ratio step during the first operating condition and changing the transmission ratio step during the second operating condition.

13. The method of supplying oil according to claim 11, further comprising the steps of producing a first pressure ($p\_1$) with the first oil supply unit (10, 110), adjusting the first pressure ($p\_1$) with the valve device (14, 114), producing a second pressure ($p\_2$) with the second oil supply unit (20), and adjusting the second pressure ($p\_2$) with a speed of an electric motor (24).

14. The method of supplying oil according to claim 11, further comprising the step of adjusting a first pressure ($p\_1$), during the first operating condition, such that a force on a first closure element (31a) of the first one-way valve (31) is smaller than a sum of forces of a second pressure ($p\_2$) and a first valve spring (31b) on the first closure element, such that a volume flow of the first oil supply unit (10, 110) does not reach the clutch system (1) via the first one-way valve (31) which is supplied by the second oil supply unit (20).

15. The method for supplying oil according to claim 11, further comprising the step of increasing, on transition from the first to the second operating condition, a value of the pressure ($p\_1$) by the valve device (14, 114) until a force of a first pressure ($p\_1$) opens the first one-way valve (31) against a sum of forces of a first valve spring (31b) and a second pressure ($p\_2$) such that a volume flow from the first oil supply unit (10, 110) flows to the clutch system (1).

16. The method for supplying oil according to claim 11, further comprising the steps of arranging a clutch (12) in the first oil supply unit (10, 110), between the first pump (11) and a transmission shaft (13) that is driven by an internal combustion engine (5), and disengaging the clutch (12) of the first oil supply unit (10, 110), during the first operating condition, and engaging the clutch (12) of the first oil supply unit (10, 110) on transition from the first to the second operating condition.

17. The method for supplying oil according to claim 11, further comprising the steps of connecting the first pump (11), in a rotationally fixed manner, to a transmission shaft (113) that is driven by an internal combustion engine (5), arranging a control valve (170) that one of connects and separates the valve device (114) and the second pump (21) of the second oil supply unit (20) between the valve device (114) and the second pump (21), and switching the valve device (114) in the first operating condition so that a first pressure line (17) is connected to a first suction line (45) and a cooling and lubrication system (2), to reduce a first pressure (p_1) to below a second pressure (p_2).

18. The method for supplying oil according to claim 17, further comprising the step of switching of the valve device (114), during the first operating condition, to reduce the first pressure (p_1) by connecting the valve device (114) by the control valve (170) to the second pump (21) so that the second pressure (p_2) acts upon the valve device (114), and on transition from the first to the second operating condition, the control valve (170) interrupting the connection between the second pump (21) and the valve device (114) in order to increase the first pressure (p_1).

19. The method for supplying oil according to claim 11, further comprising the step of, during a further operating condition with an internal combustion engine (5) switched off, maintaining a pressure (p_2) required for re-starting the vehicle with the second oil supply unit (20).

20. The automatic vehicle transmission according to claim 1, wherein a feedback line (22) connects a pressure line (27) of the second oil supply unit (20) with an electric motor (24) of the second oil supply unit (20) for controlling a speed of the electric motor (24) and thereby a speed of the pump (21) of the second oil supply unit (20).

* * * * *